(12) United States Patent
Levi

(10) Patent No.: US 6,971,563 B2
(45) Date of Patent: Dec. 6, 2005

(54) STATIONARY LADDER RACK WITH DOUBLE WEDGE INTERLOCKING MECHANISM

(76) Inventor: Avraham Y. Levi, 1339 Towerview Rd., Eagan, MN (US) 55121

( * ) Notice: Subject to any disclaimer, the term of this patent is extended or adjusted under 35 U.S.C. 154(b) by 360 days.

(21) Appl. No.: 10/424,407

(22) Filed: Apr. 28, 2003

(65) Prior Publication Data

US 2004/0211802 A1    Oct. 28, 2004

(51) Int. Cl.[7] .............................................. B60R 7/00
(52) U.S. Cl. ........................... 224/405; 224/403; 296/3
(58) Field of Search .............................. 224/405, 403, 224/547; 296/3, 26.05; 410/150

(56) References Cited

U.S. PATENT DOCUMENTS

| | | | | |
|---|---|---|---|---|
| 3,891,262 A | * | 6/1975 | Brunel | 296/3 |
| 4,138,046 A | * | 2/1979 | De Freze | 224/405 |
| 4,267,948 A | * | 5/1981 | Lewis | 224/42.34 |
| 4,398,763 A | * | 8/1983 | Louw | 296/3 |
| 4,405,170 A | * | 9/1983 | Raya | 296/10 |
| 4,770,458 A | * | 9/1988 | Burke et al. | 296/3 |
| 5,137,320 A | * | 8/1992 | Christensen | 296/3 |
| 5,393,114 A | * | 2/1995 | Christensen | 296/36 |
| 5,494,327 A | * | 2/1996 | Derecktor | 296/3 |

* cited by examiner

*Primary Examiner*—Tri M. Mai
(74) *Attorney, Agent, or Firm*—Thomas J. Nikolai; Nikolai & Mersereau, P.A.

(57) ABSTRACT

A ladder rack assembly for a work vehicle comprises first and second tubular extrusions that are designed to extend across the width dimension of the vehicle above its roof line where the extrusion is designed to include a pair of parallel channels including a wedge-shaped flange whereby clamping plates may be coupled to the flanges for rigidly joining the extruded cross members to vertically extending support legs. The support legs themselves may have the same cross sectional profile as the extruded cross member when the ladder rack assembly is to be affixed to the box of a pickup truck. Alternatively, a special clamping mechanism is provided for coupling the cross members of the ladder rack assembly to the rain diverter rail of the motor vehicle when the ladder rack assembly is to be used with a van, SUV or panel truck.

13 Claims, 8 Drawing Sheets

STATIONARY LADDER RACK WITH DOUBLE WEDGE INTERLOCKING MECHANISM

BACKGROUND OF THE INVENTION

I. Field of the Invention

This invention relates generally to ladder racks for transporting ladder loads on work vehicles, and more particularly to an aerodynamically designed, lightweight, sturdy structure that can readily be attached to the roof of a van or panel truck or to the rim of the box of a pickup truck.

II. Discussion of the Prior Art

Many professions require workers to have available one or more extension ladders in carrying out job tasks. Given the fact that such ladders may be 12 feet or more in length when the segments of the ladder are not extended, they cannot conveniently be carried within the body of a transport vehicle. Hence, various ladder rack assemblies have been devised for securing ladder loads above the roof structure of a work vehicle. In one such construction, a length of angle iron is cut to form two segments that extend the width of the vehicle. These cross members are welded or bolted to vertically extending legs that mount to the vehicle so that one angle bar traverses the width dimension of the vehicle proximate a rear portion thereof and the other traverses the width of the vehicle towards its front. Ladders are then laid across the thus mounted support bars and secured in place by ropes or bungee cords.

While welding the parts together provides high strength, but being pre-assembled, it makes it difficult and costly to ship. Moreover, all dimensions are preset and are not adjustable. Other ladder rack constructions known in the art include the use of hardware to bolt legs, crosspieces and side members together. It is also known in the art to use extruded tubular cross members having a T-slot to accommodate square-headed bolts to connect members together. This method only achieves limited strength in that the engagement between the bolt head and T-slot is limited in size.

Thus, a need exists for a ladder rack assembly that can be readily shipped from the factory and assembled by the customer for mounting on a vehicle where the resulting structure has sufficient strength to support a ladder load when subjected to jarring forces encountered when the vehicle encounter irregularities in the road.

SUMMARY OF THE INVENTION

The foregoing features and advantages are achieved in accordance with the present invention by providing a ladder rack assembly comprising a pair of ladder rack members where each ladder rack member includes a first tubular extrusion of a predetermined length sufficient to span the width dimension of the vehicle on which it is to be mounted. The extrusion has a generally planar top and bottom surface that are joined by arcuate side surfaces to create a generally oval cross-section. The extrusion further provides a generally V-shaped support structure internal to it that extends between the generally planar top and bottom surfaces. The bottom surface of the extrusion includes first and second parallel, spaced-apart channels that run the length of the extrusion where the channels are defined by first and second walls that extend perpendicular to the planar bottom surface. The second wall includes a longitudinal groove to define a flange having a tapered or wedge-shaped cross-section. The ladder rack assembly further includes a pair of support leg members for each of the ladder rack members that are attachable to a work vehicle for elevating the extruded cross members above a level of the roof of the work vehicle. Clamping means adapted to cooperate with the two wedge-shaped flanges formed on the second wall of the channel formed in the tubular extrusion rigidly couples the support leg members to the tubular extrusion proximate opposed end portions thereof.

When the ladder rack assembly is to be mounted to the side walls of the box of a pickup truck, the support leg members may comprise shorter lengths of the same extrusion as is used in forming the cross members of the ladder rack. In connecting the leg members to the cross member, a generally triangular gusset with three interconnected legs is affixed by clamping plates to the extruded cross member while a second pair of clamping plates secure a second leg of the gusset member to the support leg members.

When the ladder rack is to be secured to the roof of a van, the support leg members preferable comprise an inner rain diverter rail bracket and a cooperating grip bracket that when bolted together clamp onto the vehicle's rain diverter channels found on the roof of the vehicle.

DESCRIPTION OF THE DRAWINGS

The foregoing features, objects and advantages of the invention will become apparent to those skilled in the art from the following detailed description of the preferred embodiments, especially when considered in conjunction with the accompanying drawings in which like numerals in the several views refer to corresponding parts.

DISCUSSION OF THE PRIOR ART

Figure 1:
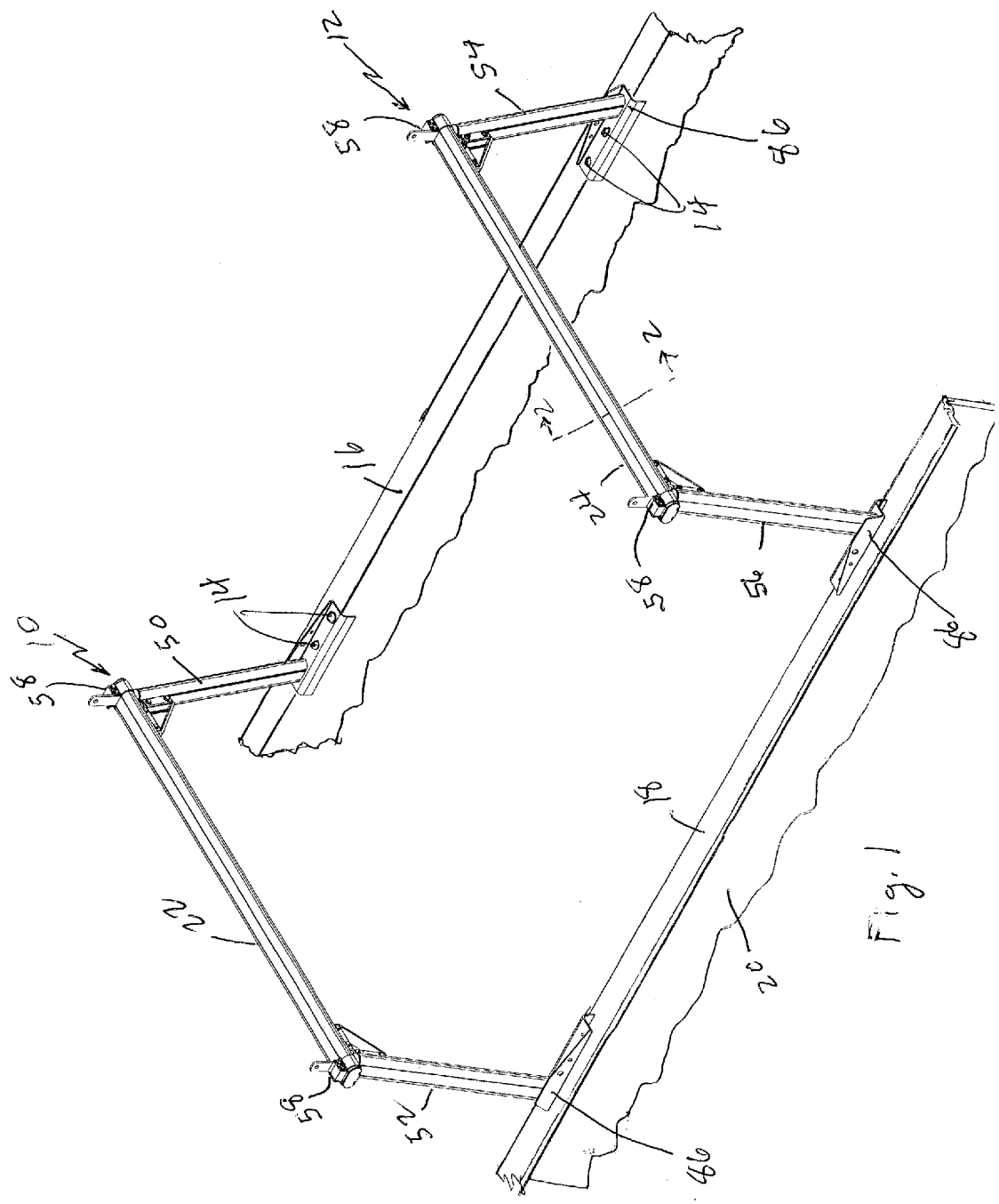
FIG. 1 is an isometric view of a first embodiment of the present invention when attached to the cargo carrying box of a conventional pickup truck.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring now to FIG. 1, there is illustrated a first embodiment of the ladder rack assembly of the present invention when affixed to the opposed sidewalls of the box of a pickup truck. The ladder rack assembly is seen to comprise first and second ladder rack members indicated generally by numeral 10 and 12 that are attached by bolts, as at 14, to the upper edges 16 and 18 of the box 20 of a pickup truck-type vehicle.

Figure 2:
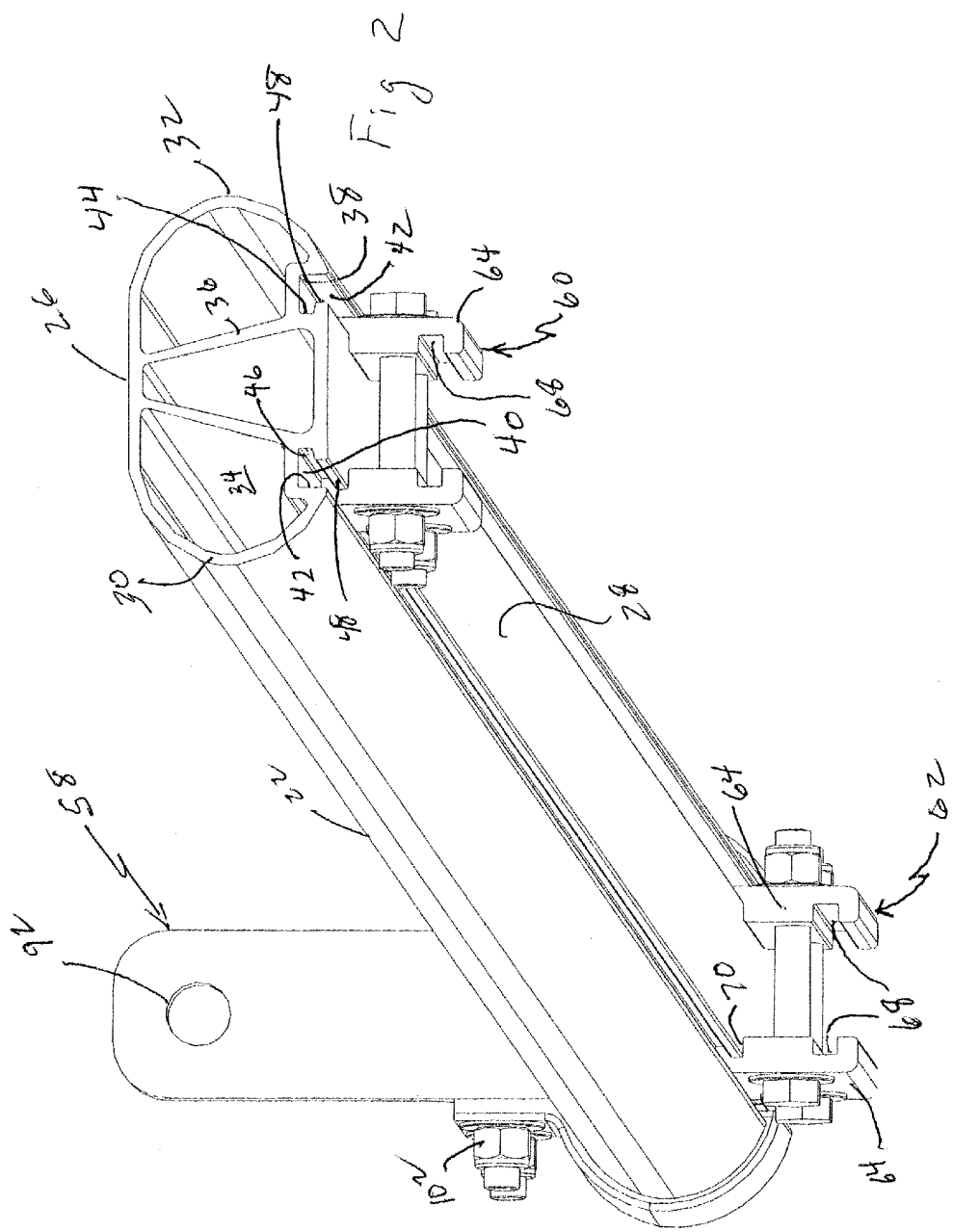
FIG. 2 is an end perspective view of the extrusion comprising the cross pieces on which the ladder load rests.

With continued reference to FIG. 1 and to the end view of FIG. 2, it will be noted that ladder rack members 10 and 12 each comprise extruded tubular cross members 22 and 24, each of a length sufficient to span the width dimension of the truck box 20. As best seen in the cross-sectional view of FIG. 2, the extrusion has generally planar top and bottom surfaces 26 and 28, respectively, that are integrally joined by arcuate side surfaces 30 and 32 to create a generally oval cross-sectional shape. Without limitation, the members 22 and 24 may preferably be extruded aluminum. To further increase the rigidity of the structure, the extrusion includes a generally V-shaped support defined by inclined walls 34 and 36 that extend between the planar top surface 26 and the planar bottom surface 28.

The bottom surface 28 includes first and second parallel, spaced-apart channels 38 and 40 that run the full length of the cross members 22 and 24. The channels 38 and 40 each have an outer sidewall 42 that is generally perpendicular to the planar bottom surface. The second sidewall 44 is undercut so as to form a longitudinal groove 46 defining a flange 48. The flange 45 is wedge-shaped, increasing in the thickness in progressing from its edge to its base.

Turning again to FIG. 1, each of the ladder rack members 10 and 12 has a pair of support legs. More particularly, support legs 50 and 52 elevate the extruded cross member 22 to a height that is slightly above the roof of the cab (not shown) of the work vehicle. In a similar fashion, support legs 54 and 56 support the extruded cross member 24 at about the same elevation.

Disposed proximate the ends of the extruded cross members 22 and 24 are ladder side stops, as at 58.

Figure 3:
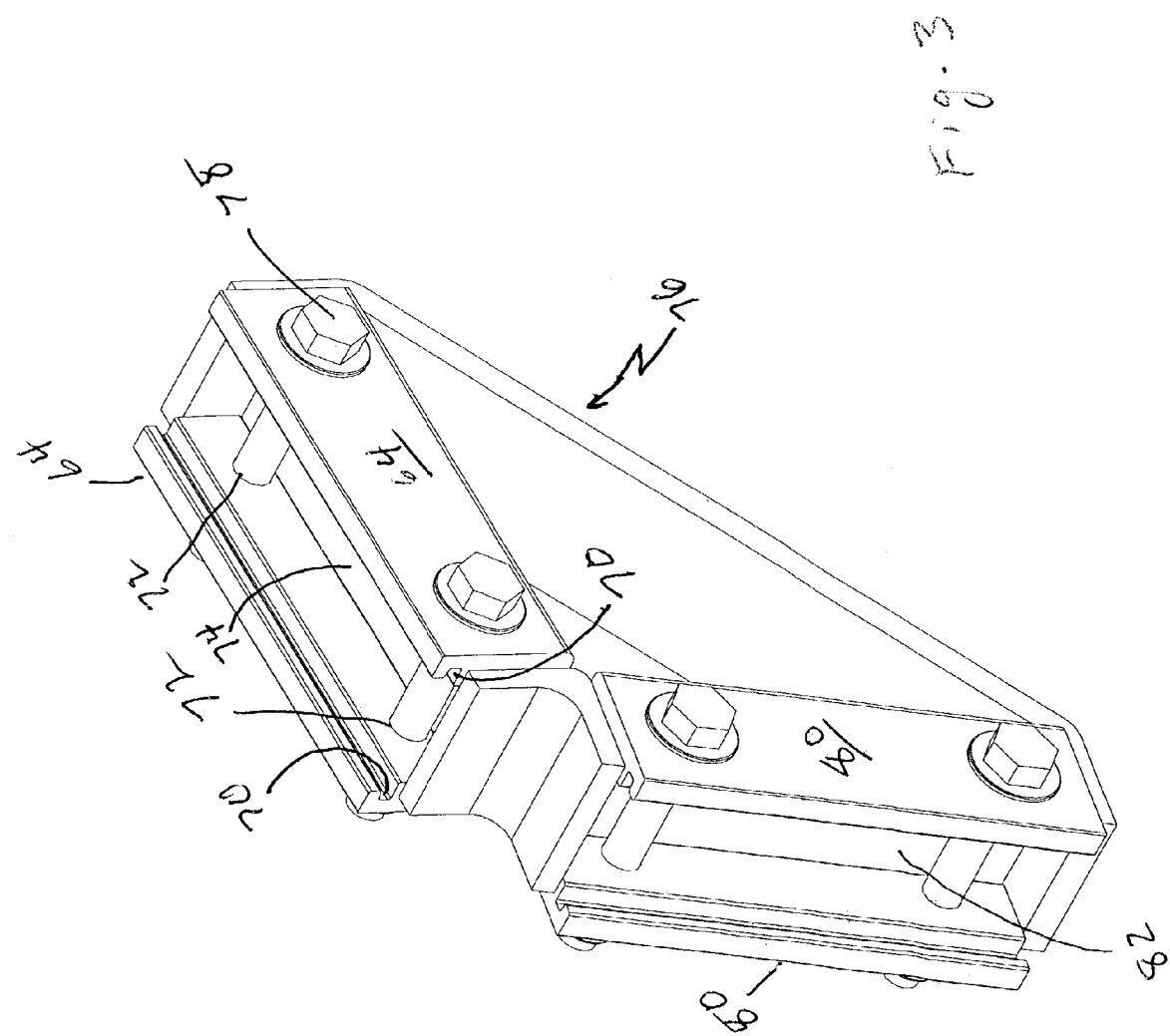
FIG. 3 illustrates a clamp assembly used to join the end portion of an extruded cross member to an associated support leg.
Figure 4:
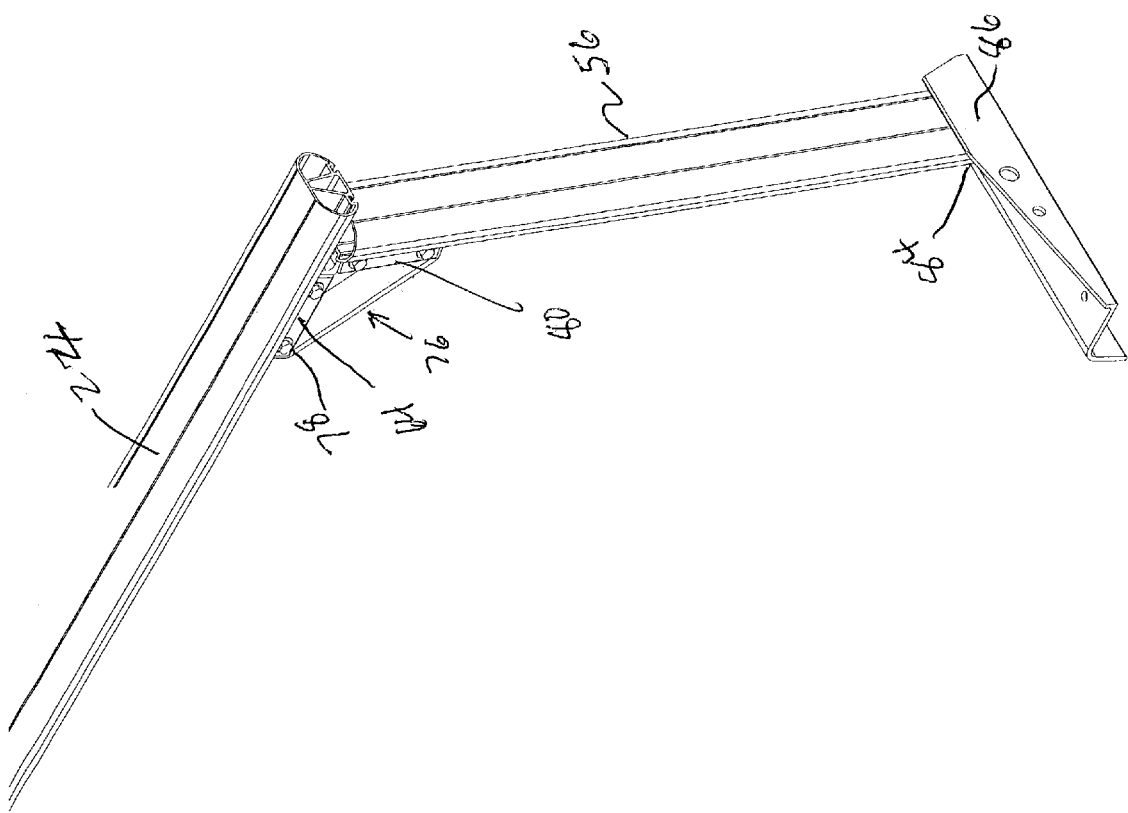
FIG. 4 is an isometric view illustrating how the device of FIG. 3 is utilized in coupling the extruded cross member to an extruded support leg.

Referring simultaneously to FIGS. 2, 3 and 4, the manner in which the extruded cross members 22 and 24 attach to their respective support leg members will next be explained. In FIG. 2, there is seen clamping means indicated generally by numerals 60 and 62 that each include two clamping plates 64. The clamping plates each include a pair of grooves as at 68–70 that are disposed on opposite sides of a pair of apertures as at 72 (FIG. 3). The grooves 70 formed in the clamping plates 64 are dimensioned to receive the tapered flanges 48 therein, as can best be seen in FIG. 2.

The grooves 68 in the clamping plates 64 are adapted to fit about one leg 74 of a three-legged triangular gusset indicated generally by numeral 76 in FIG. 3. Bolts, as at 78, passing through the apertures 72 in the clamping plates when tightened, securely fasten the gusset 76 to the extruded cross member 22 or 24. In a similar fashion, identical clamping plates 80 fasten onto the leg 82 of the triangular gusset 76 and to flanges of the extruded support leg members 50, 52, 54 and 56 to rigidly join the extruded cross members to the extruded support legs, as more fully illustrated in the isometric view of FIG. 4. Because the clamping plates have a much greater expanse than the cross-section of a square-headed bolt used in T-slots in prior art designs and because of the dual wedge feature much greater strength is afforded by the present invention.

Affixed to the free end 84 of the support leg members by welding or otherwise are mounting brackets 86 for facilitating attachment of the ladder rack members 10 and 12 to the side edges 16 and 18 of the pickup truck vehicle.

Figure 5:
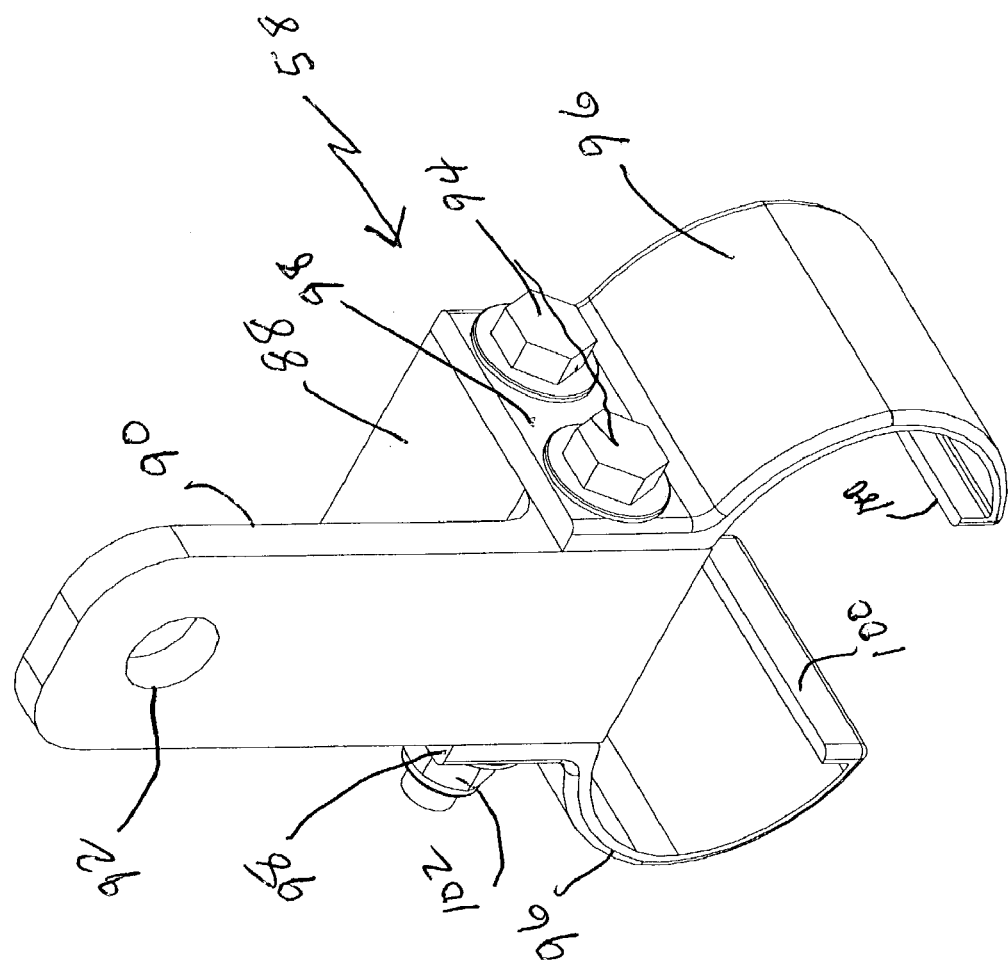
FIG. 5 is an isometric view of the ladder side stop shown in FIG. 1.

FIG. 5 is an enlarged isometric view of the ladder side stops 58 shown in FIG. 1. They are seen to comprise a base block 88 of a predetermined thickness. Extending through the base block are first and second bores (not shown) through which bolt fasteners may pass. Projecting normal to the base block 88 is a generally flat plate 90 having an aperture 92 extending through its thickness dimension. Bolted to the base block 88 by bolts 94 are a pair of arcuate clamping legs 96 that conform in shape to the arcuate side surfaces of the extrusion 22 or 24. The arcuate clamping legs include a first end 98 having apertures through which the bolts 94 pass before entering the bores (not shown) in the base block 88. The clamping legs 96 each further include gripping surfaces at 100 proximate the second end thereof for cooperating with the first straight walls 42 (FIG. 2) of the channels 38 and 40. With the nuts 102 on the bolts 94 somewhat loose, the ladder stop member can be slipped over the ends of the extruded cross members 22 and 24 and then, when the nuts 102 are tightened, the gripping surfaces of the arcuate clamping legs clamp against the wall surfaces 42 of the extrusion to rigidly lock the ladder side stops in place. The apertures 92 form a convenient opening for receiving a tie-down strap to secure a ladder load when laid across the cross members of the ladder rack assembly.

ALTERNATIVE EMBODIMENT

Figure 6:
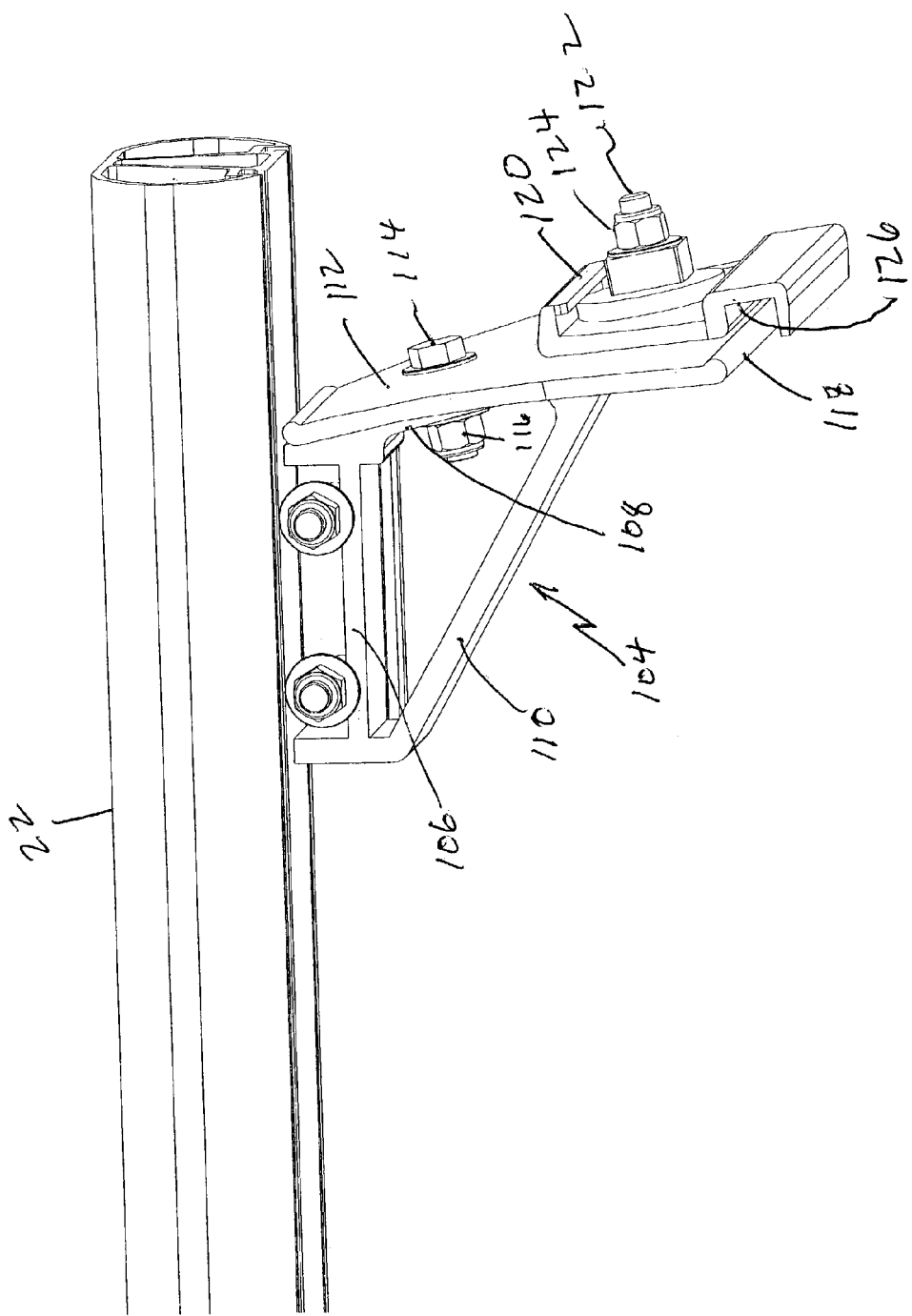
FIG. 6 illustrates an alternative embodiment of the invention when the ladder rack assembly is to be secured to the roof of a van or panel truck.

With only a slight modification, the ladder rack assembly of the present invention may also be affixed to the roof of most work vehicles by coupling it to the rain diverter rail found on most panel trucks, vans and other work vehicles. The rain diverter rail inhibits rainwater from flowing down the sides of the vehicle and, instead, routes rain water to the front and rear. In its simplest form, the rain diverter rail comprises a somewhat curved rail that extends along the roof of the vehicle just above the vehicle's door line. With reference to FIG. 6, there is shown a portion of one of the extruded cross members 22 or 24. Shown clamped to the wedge-shaped flanges 48 of the extrusion is a triangular brace 104 having a first leg 106 and a second leg 108 and with a third leg 110 extending therebetween. A first clamp member, termed an inner drip rail bracket 112, is bolted to the third leg 108 by means of a bolt 114 carrying a nut 116. The inner drip rail bracket 112 has a somewhat rounded lower edge 118 that is designed to fit within the curve of the rain diverter rail of the vehicle. A second clamp member 120 is releasably attached to the first clamp member 112 by means of a bolt 122 and a nut 124. The second clamp member may be termed a drip rail grip bracket and it includes a U-channel 126 for surrounding a portion of the vehicle's rain diverter rail. When the bolt 124 is tightened, the rain diverter rail becomes firmly clamped between the lower edge 118 of the first clamping member 112 and the walls and surfaces defining the channel 126 formed in the drip rail grip bracket 120.

Figure 7:
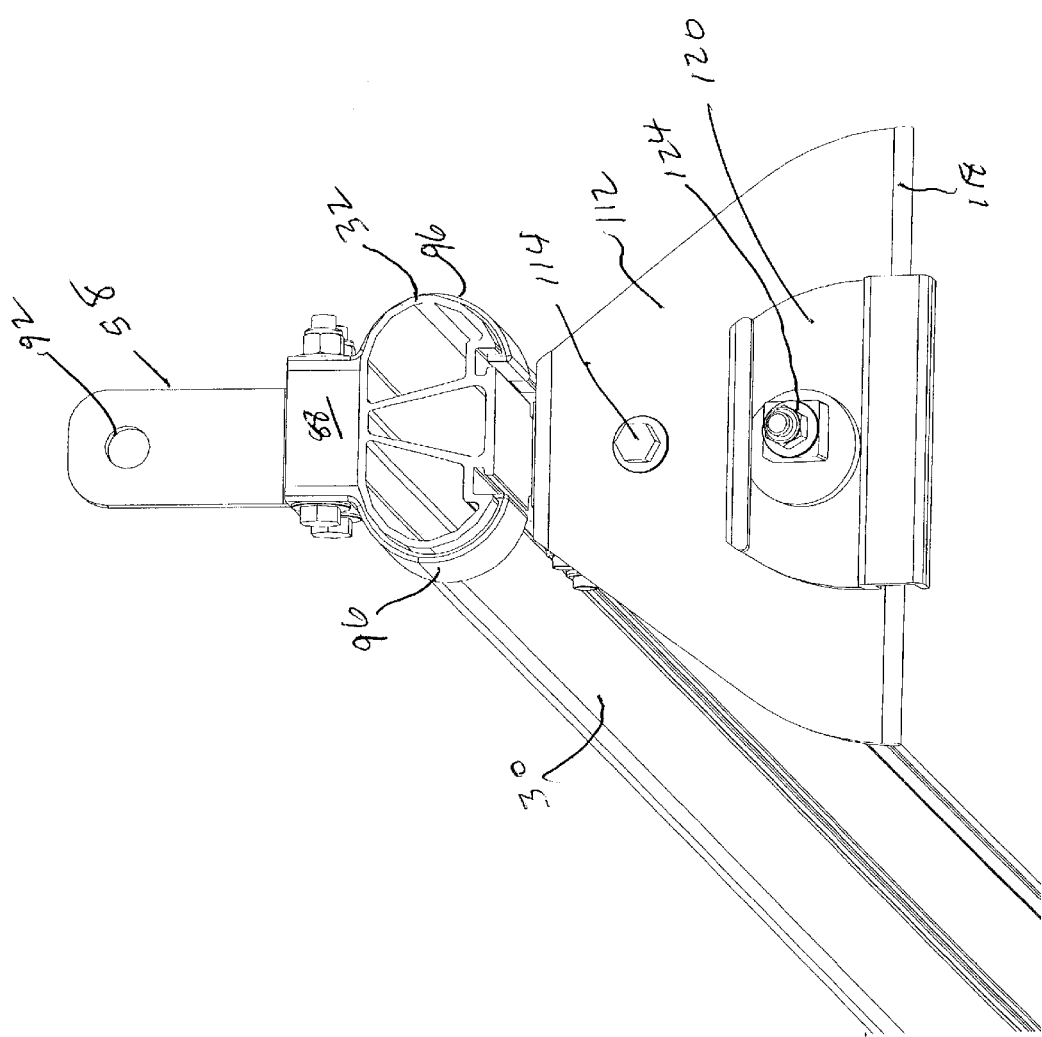
FIG. 7 is an end view illustrating the clamping mechanism used with the embodiment of FIG. 6.

The end view of FIG. 7 illustrates a preferred shape of the first and second clamp members 112 and 120.

Figure 8:
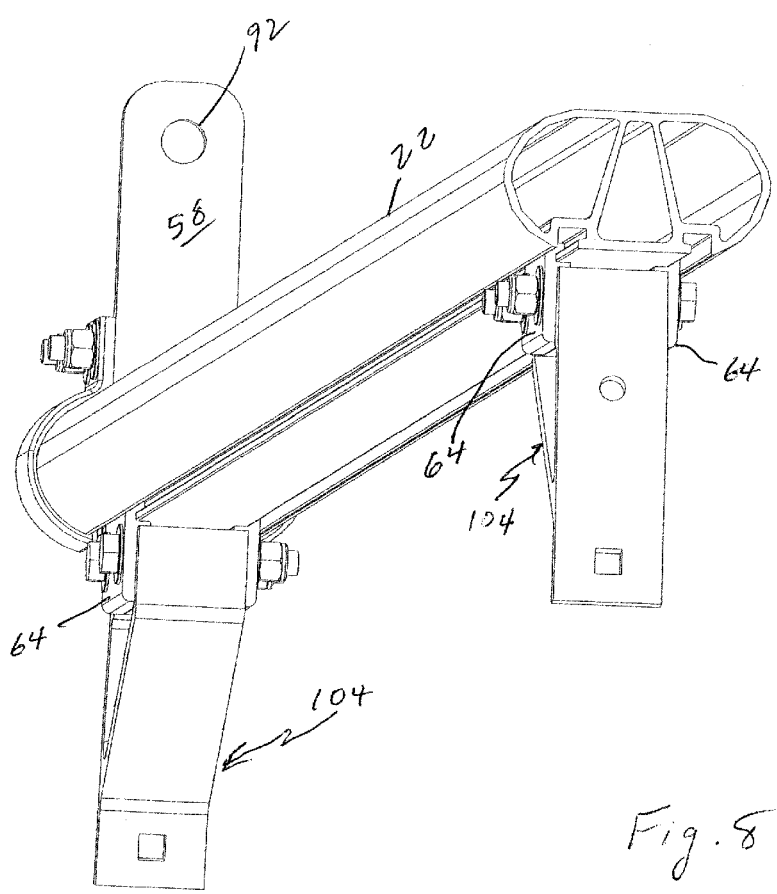
FIG. 8 is an isometric view showing the manner in which the support legs of FIG. 7 are affixed to the extruded cross member of the ladder rack assembly.

The isometric view of FIG. 8 serves to illustrate the manner in which the triangular brace 104 is secured to the extruded cross members. For ease of viewing, the clamping members 112 and 120 are removed in the view of FIG. 8. Again, clamping plates, substantially the same as clamping plates 64 earlier described in connection with FIGS. 2 and 3, are used to secure the triangular braces 104 to the extrusion. Because the manner in which the clamping plates 64 cooperate with the extrusion has already been explained in detail, it need not be repeated here.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A ladder rack assembly comprising ladder rack members, each ladder rack member comprising:
   (a) a first tubular extrusion of a first predetermined length and having generally planar top and bottom surfaces joined by arcuate side surfaces to create a generally oval cross-section and including an interior, integrally formed, generally V-shaped support structure extending between the generally planar top and bottom surfaces, the bottom surface including first and second parallel, spaced-apart channels extending said predetermined length, each of said channels defined by first and second walls extending perpendicular to the planar bottom surface, the second wall including a longitudinal groove to define a flange;
   (b) a pair of support leg members attachable to a work vehicle for elevating the first tubular extrusion above a level of a roof of the work vehicle; and
   (c) clamping means adapted to cooperate with the flange on the second wall and the longitudinal groove for rigidly coupling the support leg members to the tubular extrusion proximate opposed end portions thereof.

2. The ladder rack assembly of claim 1 wherein the flange tapers in thickness in progressing from a free edge thereof to a point of attachment to the extrusion.

3. The ladder rack assembly of claim 1 and further including a pair of ladder side stops attachable to opposed end portions of the first tubular extension.

4. The ladder rack assembly as in claim 3 wherein the pair of ladder side stops each comprises:
   (a) a flat plate projecting normal to a base block; and
   (b) a pair of arcuate clamping legs confirming in shape to the arcuate side surfaces of said extrusion and having first and second ends, the first end being affixed to the base block;
   (c) the clamping legs each further including gripping surfaces at the second ends for cooperating with the first walls of the first and second channels.

5. The ladder rack assembly as in claim 4 wherein the first ends of the pair of arcuate clamping legs are bolted to the base block.

6. The ladder rack assembly as in claim 1 wherein the clamping means comprises:
   (a) first and second clamping plates each having a pair of parallel grooves of a predetermined depth disposed on opposite sides of first and second apertures, where one of the pair of parallel grooves on the first and second clamping plates is adapted to engage the flange on the tubular extrusion defined by the longitudinal groove in the second wall, and the other of the pair of parallel grooves in the clamping plates engages the support leg members.

7. The ladder rack assembly as in claim 2 wherein the clamping means comprises:
   (a) first and second clamping plates each having a pair of parallel grooves of a predetermined depth disposed on opposite sides of first and second apertures, where one of the pair of parallel grooves on the first and second clamping plates is adapted to engage the flange on the tubular extrusion defined by the longitudinal groove in the second wall, and the other of the pair of parallel grooves in the clamping plates engages the support leg members.

8. The ladder rack assembly as in claim 6 and further including a pair of bolts extending through the first and second apertures in the first and second clamping plates and a pair of nuts disposed on the pair of bolts and which when tightened securely engage the first and second clamping plates with the first extrusion and with the support leg members.

9. The ladder rack assembly as in claim 1 wherein the pair of support leg members each comprises a segment identical to the first tubular extrusion but of a second predetermined length less than the first predetermined length.

10. The ladder rack assembly as in claim 9 wherein the clamping means comprises:
    (a) a generally triangular gusset member having three interconnected legs;
    (b) a first pair of clamping plates for securing one of the three legs of the gusset member to the first tubular extrusion; and
    (c) a second pair of clamping plates for securing a second of the three legs of the gusset member to a segment of the first tubular extrusion of the second predetermined length.

11. The ladder rack assembly as in claim 10 and further including a mounting bracket affixed to a free end of the support leg members, the mounting bracket adapted for attachment to a box of a pickup truck work vehicle.

12. The ladder rack assembly as in claim 1 wherein the pair of support leg members of each of the ladder rack members is adapted to be attached to a rain diverter on the roof of the work vehicle.

13. The ladder rack assembly as in claim 10 wherein the clamping means comprises:
    (a) a triangular brace having three legs, the first leg being attachable to the first extrusion;
    (b) a first clamp member attached to the second leg of said brace; and
    (c) a second clamp member releasably attached to the first clamp member where the rain diverter is adapted to be pinched between the first and second clamp members when the ladder rack member is positioned atop the roof of the work vehicle.

* * * * *